Sept. 20, 1955 M. O. FELIX 2,718,593
CRYSTAL-CONTROLLED ELECTRIC OSCILLATION GENERATORS
Filed July 3, 1950
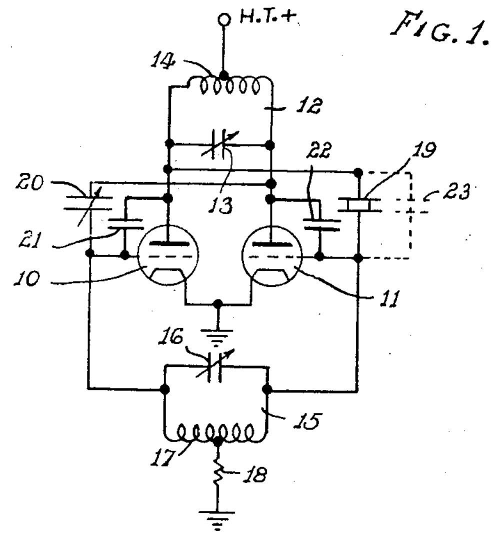
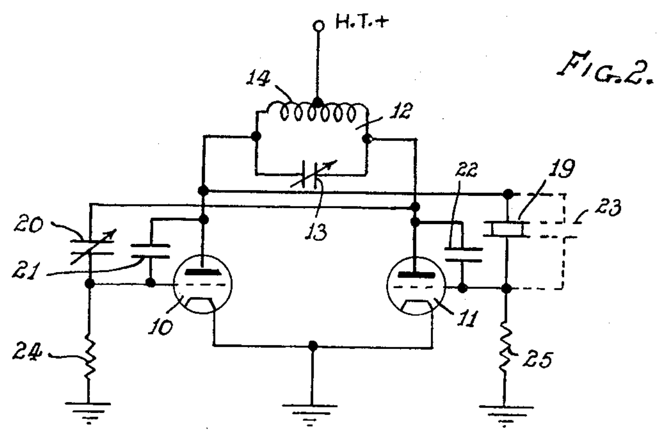
Inventor
Michael O. Felix
By Ralph B. Stewart
attorney

United States Patent Office 2,718,593

Patented Sept. 20, 1955

1

2,718,593

CRYSTAL-CONTROLLED ELECTRIC OSCILLATION GENERATORS

Michael Otto Felix, Taplow, England, assignor to British Telecommunications Research Limited, Taplow, England, a company of Great Britain Application July 3, 1950, Serial No. 171,974

Claims priority, application Great Britain July 22, 1949

3 Claims. (Cl. 250—36)

The present invention relates to crystal-controlled electric oscillation generators of the type adapted to generate an electric oscillation at the frequency of a harmonic of the fundamental resonance frequency of a piezo-electric controlling crystal.

An object of the present invention is to provide an improved oscillation generator of the type specified which is simple to adjust and stable in operation.

According to the present invention apparatus for generating an electric oscillation at the frequency of a harmonic of the fundamental frequency of a controlling piezo-electric crystal comprises two electron discharge valves each having an anode, a cathode and at least one control electrode, an oscillatory circuit connected between the anodes of said valves, a piezo-electric crystal connected between the anode of one of said valves and the control electrode of the other of said valves, a variable capacitor connected between the control electrode of said one of the valves and the anode of said other of the valves, and an untuned resistive connection between said control electrode and cathode of each of said valves.

In the generator according to the invention self-oscillation at frequencies other than those determined by the crystal is prevented by negative feed-back by way of coupling between the anode and control electrode of each of the valves. Oscillation at the desired frequencies is produced by positive feed-back by way of the crystal and the variable capacitor. The variable capacitor can be adjusted to a value such that the total positive feed-back at frequencies other than harmonics of the fundamental frequency of the crystal is not sufficient to overcome the effect of the negative feed-back and hence oscillation is not produced.

In some applications of the invention the inter-electrode capacitance between the anodes and control electrodes of the valves may be adequate to provide the degree of negative feedback required. In other applications it may be found necessary to supplement this capacitance by connecting a capacitor between the anode and control electrode of one or each of the two valves.

Reference will now be made to the accompanying drawings, in which Figure 1 is a theoretical circuit diagram of a known oscillator of the type specified, and Figure 2 is a theoretical circuit diagram of an oscillator according to the present invention.

A known oscillation generator of this type will now be described, by way of example, with reference to Figure 1 of the accompanying drawings.

The generator shown in Figure 1 comprises two triode valves 10 and 11 whose anodes are connected to opposite ends of a tuned circuit 12 comprising a variable capacitor 13 and a centre-tapped inductor 14. The centre tap on the inductor 14 is connected to the positive terminal H. T.+ of a source (not shown) of high tension voltage whose negative terminal is earthed. The cathodes of the two triodes are earthed and a further tuned circuit 15, comprising a variable capacitor 16 and a centre-tapped inductor 17, is connected between the control grids of the two triodes. The centre tap on the inductor 17 is connected to earth through a resistor 18. A crystal 19 is connected between the anode of the valve 10 and the control grid of the valve 11, and a neutralising capacitor 20 is connected between the anode of the valve 11 and the control grid of the valve 10. Capacitors 21 and 22 are shown to be connected between the anodes and control grids of the two valves respectively and include the anode/grid capacitances of the two valves respectively. The shunt capacitance of the crystal 19 and its holder is represented in broken lines by a capacitor 23.

It will be seen that the capacitors 20, 21, 22 and 23 constitute a capacitor bridge and, in operation, the capacitor 20 is adjusted to balance the bridge. In setting the generator to generate an electric oscillation at a harmonic of the fundamental of the crystal of frequency $f_n$, the capacitor 20 is adjusted to unbalance the bridge, the two circuits 12 and 15 are both tuned to a frequency just below $f_n$ and hence free oscillations are produced. The neutralising capacitor 20 is then adjusted to balance the bridge, balance being indicated by the cessation of oscillations. The circuits 12 and 15 are then adjusted to the frequency $f_n$ and the generator goes into oscillation at that frequency under the control of the crystal.

Further generators of the type specified are described in pages 464 to 472 of the Proceedings of the Institute of Radio Engineers, vol. 30, 1942.

Generators of the type specified are normally employed to generate oscillations at very high frequency and have the advantages of reducing the number of frequency multiplier stages necessary to produce a given output frequency, or eliminating the need for such stages, and of reducing spurious oscillations at unwanted multiples of the fundamental frequency of the crystal. On the other hand the known oscillators of the type set forth have the disadvantages that they are tedious to adjust—the neutralising capacitor in particular requires critical adjustment—and are liable to oscillate at an uncontrolled frequency if the circuit values change by a small amount.

In Figure 2 it will be seen that the circuit 15 and resistor 18 of Figure 1 are replaced by two resistors 24 and 25 connected between the control grids of the valves 10 and 11 respectively and earth. The resistances of the resistors 24 and 25 are made high relatively to the reactance of the grid-cathode capacitances of the valves at the operating frequency of the generator, and will usually be of the order of 100 kilohms to 1 megohm. The impedance between each of the control grids and earth is therefore almost entirely capacitive, and hence feedback by way of the capacitors 21 and 22 is negative. On the other hand feedback by way of the capacitors 20 and 23 is positive.

If the positive feedback exceeds the negative feedback and the gain is sufficient to make good the losses the tuned circuit obviously goes into free oscillation. It can be arranged, however, by giving the capacitors 21 and 22 suitable values, that the negative feedback exceeds the positive feedback by an amount sufficient to prevent free oscillation, but insufficient to prevent controlled oscillation as a result of positive feedback through the crystal 19 when the circuit 12 is tuned to the fundamental frequency or harmonic thereof of the crystal.

For convenience the values of the capacitors 20 to 22 will hereinafter be referred to by the letter C followed by the reference numbers of the capacitors respectively, and the equivalent capacitance of the crystal and its holder by $C_x$; at frequencies differing by more than a small percentage from the crystal fundamental and harmonic resonances, the value of $C_x$ is almost constant. The value of capacitor 20 is made such that $(C_{20}+C_x)$ is less than $(C_{21}+C_{22})$, and the overall feedback between the anodes of valves 10 and 11 and their grids is thus negative. It is therefore impossible for the circuit to oscillate at frequencies removed from crystal resonance.

At the fundamental and harmonic frequencies of the crystal, the effective capacitance of the crystal increases to a maximum $C_Y$. If the value of $C_Y$ is such that $(C_{20}+C_Y)$ exceeds $(C_{21}+C_{22})$, and the circuit 12 is tuned to this frequency, then the overall feedback between the anodes of valves 10 and 11 and their respective grids is positive. The circuit will therefore oscillate provided that the loop gain exceeds unity.

It will be seen that there exists a critical value for capacitor 20, below which the circuit cannot oscillate except under crystal control. For many applications, a value of capacitor 20 may be chosen so much less than the critical value that adjustment of any of the four feedback capacitors 20, 21, 22 and 23 is unnecessary. In this case values may be chosen for capacitors 21 and 22, such that the required value of capacitor 20 is made zero. Such a circuit has, for example, been found satisfactory with the third harmonic of a crystal of 10 mc./s. fundamental frequency. The values of capacitors 21, 22 and 23 were each 5 $\mu\mu$F, allowing a considerable safety factor against free oscillation.

In the same circuit, a capacitor 20 of value 2 $\mu\mu$F was added. The circuit then oscillated on the 7th harmonic of a crystal of 5.5 mc./s. fundamental frequency.

On continually increasing the value of capacitor 13, it was found that the frequency jumped from the 7th to the 5th harmonic without ever breaking into uncontrolled oscillation.

I claim:

1. An oscillator circuit comprising a pair of electron tubes each having an anode, a cathode and a control grid, a source of anode current, means connecting said cathodes together and to the negative terminal of said source through a connection of substantially zero resistance, a piezo-electric crystal connected between the anode of the first tube and the control grid of the second tube, a condenser connected between the anode of the second tube and the control grid of the first tube, an inductance coil connected between the anodes of said tubes, a connection from the positive terminal of said source to the mid-point of said coil, a condenser connected in shunt to said coil and forming with said coil a resonant circuit tuned to a harmonic of the fundamental frequency of the crystal, and a high resistance connection between each grid and the cathode of each tube and providing negative feedback in conjunction with the capacitance between the anode and control grid of each tube.

2. An oscillator circuit according to claim 1 wherein the first-mentioned condenser has a capacitance value such that the sum of its capacitance and the equivalent capacitance of the crystal at frequencies differing substantially from the fundamental and harmonic frequencies is less than the sum of the anode-to-grid capacitances of said tubes, and the sum of the capacitance of said condenser and the effective capacitance of the crystal at its fundamental and harmonic frequencies is greater than the sum of the anode-to-grid capacitances of said tubes.

3. An oscillator circuit according to claim 1 in which the anode-to-grid capacitances inherent in the tubes are supplemented by capacitors connected respectively between the anode and control electrodes of the tubes.

References Cited in the file of this patent

UNITED STATES PATENTS

| | | |
|---|---|---|
| 2,053,787 | Wassell | Sept. 8, 1936 |
| 2,111,603 | Usselman | Mar. 22, 1938 |
| 2,303,862 | Peterson | Dec. 1, 1942 |
| 2,557,310 | Peterson | June 19, 1951 |